UNITED STATES PATENT OFFICE 2,411,835

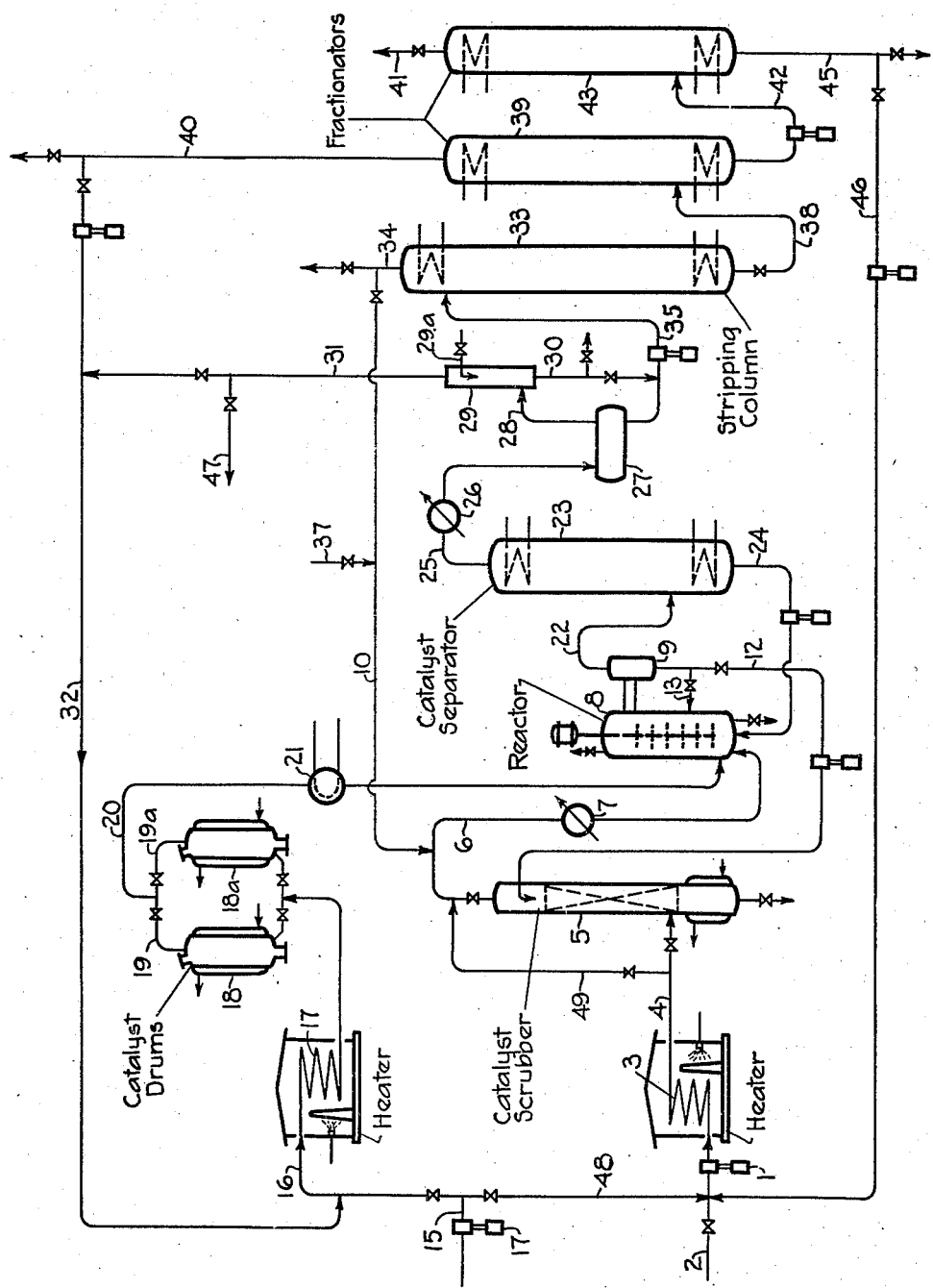

ISOMERIZING HYDROCARBONS

William E. Ross, Berkeley, and George J. Carlson, El Cerrito, Calif., assignors to Shell Development Company, San Francisco, Calif., a corporation of Delaware Application March 14, 1944, Serial No. 526,406

9 Claims. (Cl. 260—683.5)

This invention relates to the isomerization of hydrocarbons and relates more particularly to the isomerization of hydrocarbons having from 5 to 10 carbon atoms to the molecule and hydrocarbon fractions comprising them.

Feasibility of executing the isomerization of paraffin hydrocarbons with the aid of catalysts comprising metal halides of the Friedel-Crafts type on a practical scale is governed to no small degree by the ease with which the tendency of these catalysts to promote undesirable side reactions can be overcome and the isomerization reaction be made to dominate. The degree to which this problem influences the particular process is dependent upon the nature of the hydrocarbon charge. The more stable hydrocarbons, such as, for example, the butanes, can be readily isomerized in the absence of these difficulties with the aid of any of the available isomerization catalysts. The isomerization of these more stable hydrocarbons is readily accomplished in either the vapor or liquid phase with isomerization catalysts of the solid type comprising the metal halide per se, optionally in combination with a suitable solid diluent or support material which may or may not exert a promoting effect upon the catalyst. The more readily degraded hydrocarbons comprising those having from 5 to 10 carbon atoms to the molecule, particularly the pentanes, branched hexanes, and hydrocarbon fractions comprising them, are more difficult to isomerize economically on a large scale due to the comparative ease with which they degrade in the presence of metal halides of the Friedel-Crafts type. These difficulties are offset to some degree by the use of fluid type isomerization catalysts. The fluid type isomerization catalysts vary considerably from one to another. They comprise the metal halides of the Friedel-Crafts type, for example aluminum halide, as a suspension or solution in a suitable liquid vehicle. The liquid vehicle may comprise a hydrocarbon or hydrocarbon mixture which may be a part of the material treated. Other carrying liquids may comprise a hydrogen halide such as hydrogen chloride; alkyl halides; $SO_2$, etc., or any other liquid inert at the operating conditions. Another type of fluid isomerization catalyst comprises fluid organo-aluminum halide complexes. Still another type of fluid isomerization catalyst comprises the aluminum halide as a solution or suspension in a suitable molten salt or mixture of molten salts. The molten salt may simply function as a carrying medium or it may act as a catalyst modifier or as a separate catalyst component to form a true mixed molten salt catalyst. Particularly suitable molten salt type aluminum halide-containing catalysts comprise a molten mixture of aluminum halide and a halide of antimony, for example a melt comprising aluminum chloride dissolved in antimony trichloride, a molten mixture of an aluminum halide and at least one halide salt of an alkali or alkaline earth metal, etc. Of these various fluid type isomerization catalysts, those of the molten salt type are often somewhat preferred.

However, in processes available heretofore, utilizing catalysts of the fluid type, difficulties inherent in the use of these catalysts are often aggravated by the degradation of the paraffinic hydrocarbons having from 5 to 10 carbon atoms to the molecule, thereby presenting problems which detract materially from the full realization of the advantages to be derived from the use of these catalysts. One of these difficulties is the maintenance of the fluid catalyst within the system at the optimum conditions of composition enabling efficient conversion to the desired product in the absence of any substantial hydrocarbon decomposition. Localized concentration of the active metal halide constituent, even for the relatively short time between its introduction into the system and its dispersion through the catalyst mass, often results in substantial degradation of hydrocarbons and consequent formation of inactive sludgy catalyst material resulting not only in a loss of valuable catalyst and charge material but in the presentation of mechanical difficulties in maintaining proper flow through the system. The addition of make-up aluminum halide to a heated portion of the charge generally results in the formation of inactive sludgy catalyst material even before the mixture enters the reaction zone. Attempts to overcome this difficulty by heating only a portion of the charge to the reaction zone and adding the aluminum halide to a separate unheated portion of the charge, although obviating the difficulty to some extent, still does not enable smooth operation, nor does it prevent undue loss of catalyst and charge or unbalancing of catalyst composition within the system.

It has furthermore been found that the inactive sludgy catalyst thus formed in the reactor decidedly represses the catalyst activity of many of the more active fluid isomerization catalysts, and particularly those of the molten salt type, with respect to the paraffin isomerization reaction. It has been found that it is essential to practical operation of the process with the aid of certain of these catalysts that inactive sludge thus formed be kept below a certain maximum concentration and that substantially improved efficiency in operation is obtained by removing inactive catalyst sludge from the reaction zone substantially as rapidly as formed.

The highly repressive action of the inactive sludge formed in the system in the isomerization of hydrocarbons having from 5 to 10 carbon atoms to the molecule upon the fluid isomerization catalysts of the molten salt type is evidenced by the following example.

*Example I*

Pentane was contacted with a fluid type catalyst consisting of aluminum chloride dissolved in molten $SbCl_3$ at a temperature of 95° C., catalyst to hydrocarbon phase ratio of 1:1, and a contact time of 9 minutes. A conversion of normal pentane to isopentane of 71.1% was attained. In a parallel operation with identical feed and at substantially identical conditions of operation, but with the exception that a sludgy spent catalyst (formed in a previous paraffin isomerization) was added to the catalyst charge in the small amount of 0.5% by weight of the fluid catalyst. This quantity of added spent sludgy catalyst was sufficient to lower the activity of the catalyst to such a degree that conversion to isopentane was only 41% compared to the above-cited value of 71%.

*Example II*

2-methylpentane was stirred in a rotary mixer with 300 g. of a fluid type catalyst consisting of aluminum chloride dissolved in $SbCl_3$ at a temperature of 75° C. The time of contact was 30 minutes and 12 g. of HCl were added to the reactants. Under these conditions 34% neohexane was produced. In a comparative experiment carried out under substantially identical conditions but with the exception that 25 g. of a sludgy spent catalyst, resulting from the action of $AlCl_3$ on methylpentane, was added to the system, only 3% neohexane resulted.

It has also been found that substantially improved results as determined by conversion and yield per pound of active metal halide constituent in the catalyst is obtained by maintaining in the catalyst mass and subsequently adding to the charge an amount of the active metal halide component sufficient to maintain only a small quantity of highly dispersed active metal halide in the fluid catalyst mass. Another advantage inherent in the use of only such small amounts of active metal halide component in the catalyst mass resides in the ability to use higher temperatures within the permissible operating range in the absence of the difficulties normally encountered when using greater concentrations of the active halide component. With the use of fluid salt type isomerization catalysts it has been found that a concentration of the active metal halide of the Friedel-Crafts type in the catalyst mass not substantially in excess of about 3% by weight, and preferably not substantially in excess of about 2% by weight, is highly desirable.

The effect of the reduced amount of aluminum halide in the catalyst when isomerizing hydrocarbons having from 5 to 10 carbon atoms to the molecule with the aid of a fluid type isomerization catalyst of the molten salt type is shown by the following example.

*Example III*

Pentane was contacted in a plurality of comparative operations with a fluid type catalyst consisting of a solution of aluminum chloride in molten antimony trichloride at the following conditions:

| | |
|---|---|
| Temperature °C | 95 |
| Hydrogen pressure lbs | 55–60 |
| Ratio of catalyst to hydrocarbon by vol | 1:1 |
| HCl added to feed percent by weight | 3.7–4.2 |
| Time of contact minutes | 9 |

The aluminum chloride content of the fluid catalyst was maintained constant in each run and the catalyst was maintained substantially free of any spent catalyst sludge during the operation. The amount of aluminum chloride maintained in the catalyst of each operation, and results obtained in terms of pentane conversion to isopentane, and pentane degradation as determined by isobutane production, are indicated in the following table:

| Run No. | Wt. per cent $AlCl_3$ in catalyst | Per cent conversion to isopentane | Per cent disproportionation of pentanes to isobutane |
|---|---|---|---|
| 1 | 0.5 | 60.6 | 0.5 |
| 2 | 1.0 | 65.1 | 1.2 |
| 3 | 2.0 | 71.1 | 2.2 |
| 4 | 2.9 | 69.7 | 2.8 |

Maintaining such small amounts of aluminum halide in a highly dispersed condition in the reaction zone in the treatment, at isomerizing conditions, of the more readily degraded hydrocarbons is, however, exceedingly difficult, and often impossible, in processes utilized heretofore. Immediate deactivation of at least a substantial portion of the small amounts of aluminum halide content of the catalyst with the formation of undesirable sludge is generally encountered. Dispersing such small amounts of aluminum halide through the catalyst mass or reactants in the reaction zone during operation has generally been difficult to attain by addition of the metal halide together with the charge or by direct addition as such into the reaction zone. Introduction of the active metal halide by such means as practiced heretofore usually results in a localized concentration of the metal halide for a period of time which, even though exceedingly short, is sufficient to bring about the difficulties referred to hereinbefore.

It is an object of the present invention to provide an improved process for the more efficient isomerization of paraffinic hydrocarbons having from 5 to 10 carbon atoms to the molecule and hydrocarbon fractions comprising them wherein the above difficulties are obviated to at least a substantial degree. Further objects and advantages of the invention will become apparent from the following detailed description thereof.

It has been found that the difficulties heretofore encountered in the isomerization of the more readily degraded hydrocarbons is obviated to at least a substantial degree by introducing the active metal halide constituent of the catalyst into the reaction zone in the form of a dilute solution in a suitable solvent substantially free of hydrogen halide. In accordance with the process of the invention, an isomerizable paraffinic hydrocarbon having from 5 to 10 carbon atoms to the molecule optionally in the presence of other hydrocarbons capable or not of undergoing isomerization under conditions of execution of the invention and/or in the presence of an added inert gas, is contacted with a fluid type isomerization catalyst comprising a metal halide of the Friedel-Crafts type. The solvent for the metal halide is preheated in a separate stream to a temperature sufficiently high to dissolve a sufficient amount of the metal halide therein. The resulting heated solvent stream is passed through a vessel containing the active metal halide component of the catalyst and the resulting stream consisting of a dilute solution of the metal halide in the solvent is passed into the reaction zone. The solvent is separated from the reactor effluence and recycled through the vessel containing the metal halide and the reaction zone. In a preferred embodiment of the invention only a small amount of the active metal halide component of the catalyst is maintained in a highly dispersed condition throughout the catalyst mass and/or reactants in the reaction zone.

Suitable solvents for the active metal halide component of the catalyst comprise suitable fluid materials capable of introducing the metal halide into the reaction zone in dilute solution, thereby obviating local concentration of the metal halide in the catalyst or reactants and enabling its immediate dispersal through the reaction zone. The solvent is one that is inert or has no deleterious effect upon catalyst, reactants or operating conditions at the conditions of execution of the process. It is, furthermore, advantageous to use as the solvent one that is readily separated by available means from the reactor effluence within the system. A suitable solvent comprises, for example, ethyl chloride. Advantageous solvents comprise the less readily degraded paraffin hydrocarbons, particularly those of lower boiling point than the hydrocarbon being isomerized. Such a solvent hydrocarbon may undergo isomerization to some degree under conditions of operation of the process and may comprise a mixture of isomers corresponding to an equilibrium mixture thereof at the conditions of operation. Particularly advantageous low-boiling paraffinic hydrocarbons suitable as solvents for the active metal halide components of the fluid type isomerization catalyst in the isomerization of paraffinic hydrocarbons having from 5 to 10 carbon atoms to the molecule comprise the butanes.

Isomerizing conditions at which the paraffinic hydrocarbons are converted in the presence of the fluid type catalysts comprise a temperature in the range of, for example, from about room temperature to about 150° C. The operation may be carried out in the liquid, vapor or mixed phase. It is to be pointed out that operating temperatures have been largely limited by the scope of the accompanying decomposition reaction and that consequently the present invention enables efficient operation at somewhat higher temperatures than possible heretofore in the absence of hydrocarbon decomposition suppressors. The isomerization reaction may be executed at subatmospheric, atmospheric or superatmospheric pressures. In the case of liquid phase operation a sufficiently high superatmospheric pressure is, of course, maintained to keep at least a substantial part of the reactants in the liquid phase.

The isomerization is preferably executed in the presence of a hydrogen halide promoter such as, for example, hydrogen chloride. The amount of hydrogen chloride used may vary widely in accordance with operating conditions. In general, an amount of hydrogen chloride equal to from about 0.3% to about 40% of the hydrocarbon charge is found to be sufficient. Higher proportions of the hydrogen chloride may, however, be used. It is to be stressed that in order to attain the full realization of the advantages of the invention it is essential that the presence of hydrogen halide in the solvent for the active metal halide component of the catalyst, or in the dilute solution of metal halide in the solvent, be avoided, or kept at a minimum practical concentration, prior to entry into the reaction zone.

The hydrocarbons or hydrocarbon mixtures treated are preferably substantially free of materials, the presence of which adversely affects the activity of the catalyst. Olefins, diolefins, aromatic hydrocarbons or other detrimental impurities in the hydrocarbon or hydrocarbon mixture to be treated are preferably removed prior to isomerization by a suitable treatment which may comprise one or more of such steps as mineral acid refining, hydrogenation, alkylation, contact with clay or with a part of the spent catalyst, solvent extraction, etc.

In order to set forth more fully the nature of the invention it will be described in detail herein in its application to the conversion of pentane to isopentane with the aid of a fluid type isomerization catalyst of the molten salt type. It is to be understood, however, that it is in no wise intended to limit the invention to the isomerization of this particular hydrocarbon or to the use of this particular type of fluid isomerization catalyst and that the invention may be applied broadly to the isomerization, comprising the treatment under isomerizing conditions, of any of the paraffinic hydrocarbons having from 5 to 10 carbon atoms to the molecule, mixtures of two or more thereof, or hyocarbon fractions comprising one or more thereof, with the aid of any of the available fluid type isomerization catalysts. The description of the invention will be made with reference to the attached drawing forming a part of this specification and wherein the single figure illustrates one form of apparatus suitable for execution of the invention.

An isomerizable paraffinic hydrocarbon having from 5 to 10 carbon atoms to the molecule, for example normal pentane, from any suitable source is forced by means of pump 1, through valved line 2, into a heating zone comprising, for example, an externally heated coil 3 wherein the hydrocarbon stream is heated to a temperature sufficiently high to maintain the desired temperature conditions in a subsequent scrubbing and/or reaction zone. From the heating zone the heated hydrocarbon stream is passed into an extraction column 5. Within extraction column 5 the hydrocarbon stream is contacted in the liquid phase with a portion of the catalyst emanating from the reaction zone as described more fully below. Liquid pentane comprising extracted catalyst components is passed from extraction column 5 through valved line 6 and heat exchanger 7 into a reaction zone.

The reaction zone may consist of a suitable reactor 8 provided with stirring means and a separator 9. Within the reactor 8 the pentane is contacted with a suitable isomerization catalyst of the fluid type, for example a molten salt type catalyst comprising a metal halide of the Friedel-Crafts type. A suitable catalyst comprises a solution of a halide of aluminum, for example aluminum chloride, in a halide of antimony, for example antimony trichloride. Although the amount of aluminum chloride in the catalyst melt may vary considerably within the scope of the invention, an advantageous feature of the process of the invention is the possibility of maintaining lower concentrations of aluminum chloride highly dispersed throughout the melt with substantially improved conditions of operation. The amount of aluminum chloride in the catalyst melt is preferably maintained below about 3% and preferably below about 2% by weight of the catalyst melt. The ratio of the catalyst to hydrocarbon in the reaction zone is maintained in the range of, for example, from about 1:5 to about 3:1, and preferably from about 1:1 to about 1.5:1 by volume. The hydrogen halide promoter, for example HCl, is introduced into line 6 by means of line 10. Within separator 9 a hydrocarbon layer is separated from a lower catalyst layer comprising spent catalyst produced within the system. The catalyst layer is constantly withdrawn through valved line 12 and passed to the upper part of extraction column 5. A portion of the catalyst may be returned to the reactor through line 13. The portion of the catalyst introduced into extraction column 5 will pass countercurrent to the upflow of liquid hydrocarbons. In its passage through column 5 active components comprising antimony chloride are dissolved in the hydrocarbon stream and passed therewith to reactor 8. Another portion of the catalyst comprising components which are spent or at least partly spent with respect to their ability to catalyze the isomerization reaction remains insoluble in the hydrocarbon stream and is separated therein as a heavier fluid catalyst residue.

The hydrocarbon charge to scrubber 5 is preferably preheated to a temperature favorable to the extraction operation. This temperature will vary with the nature of the material being treated and the particular catalyst used. Temperatures in the approximate range of from 50° C. to 125° C. and preferably from 50° C. to 100° C. are found suitable. The pressure within column 5 is always sufficiently high to maintain at least a substantial portion of the hydrocarbon stream passing therethrough in the liquid phase.

The rate at which catalyst is withdrawn from separator 9 and passed to the upper part of extractor 5 may vary within the scope of the invention. In a preferred embodiment of the invention, however, not only is the amount of aluminum chloride maintained in the reaction zone exceedingly small and in a highly dispersed state but any spent catalyst formed in the reaction zone is removed therefrom substantially as rapidly as formed and replaced by active catalyst. At least partly spent catalyst is, therefore, passed substantially continuously from separator 9 to extractor 5 to effect the removal of inactive spent catalyst from reactor 8 substantially as rapidly as formed therein.

Maintenance of a low concentration of aluminum chloride in the catalyst melt, together with continuous withdrawal of spent catalyst, requires the substantially continuous addition of fresh aluminum chloride throughout the operation in order to replace the catalyst removed and maintain a desired substantially constant catalyst composition. Continuous addition of the make-up aluminum chloride is carried out in the process of the invention, in the absence of any of the difficulties experienced in processes used heretofore, by forcing a suitable solvent for the aluminum chloride, for example a low-boiling hydrocarbon such as a butane, isobutane, or a mixture thereof corresponding to the equilibrium mixture prevailing at the conditions of operation, from any suitable source through valved lines 15 and 16 into a heating zone. The heating zone may comprise a heat exchanger or an externally heated elongated coil 17. From coil 17 the preheated butane stream is passed through at least one of a series of vessels 18—18a containing aluminum chloride. Butane comprising dissolved aluminum chloride is taken from vessel 18 and passed through valved lines 19 and 20 into reactor 8. Solubility of the aluminum chloride in the butane stream increases progressively with increase in temperature. Thus, the amount of aluminum chloride dissolved in normal butane varies from about 0.02% by weight at 40° C. to about 2.0% by weight at 95° C. The temperature to which the butane solvent is heated in heater 17 is carefully controlled to dissolve the proper proportion of the aluminum chloride therein to maintain the desired composition of the catalyst in the reaction zone. In this wise the flow rate of solvent can be maintained constant and the quantity of AlCl₃ dissolved therein controlled by varying the heat input in heater 17. By operating in this wise the maintenance of a low concentration of aluminum chloride in a highly dispersed state through the reactants in the reaction zone is made possible in the absence of any of the difficulties heretofore experienced in the treatment of readily degraded hydrocarbons in the presence of the fluid type isomerization catalysts comprising metal halides of the Friedel-Crafts type. The advantages of the process comprise not only an improved means for introducing the aluminum halide into the reactor but the ability to maintain the added aluminum halide in a highly dispersed state due to the increased volume of hydrocarbons within the reactor.

As stressed above, it is essential that the butane solvent entering drums 18—18a be free of any substantial amount of hydrogen halide. For, though the butanes are relatively stable in the presence of AlCl₃, the inclusion of a hydrogen halide in the solvent, while dissolving AlCl₃ therein, or in the dilute solution passing through line 20 into the reaction zone, still results in rapid production of undesirable spent catalyst sludge and difficulties in maintaining the active component of the catalyst in the properly dispersed state. In the process of the invention the hydrogen halide promoter is removed to at least a substantial degree from any butane solvent recycled to vessels 18—18a.

When continuously scrubbing a part of the least spent catalyst in extractor 5 the pentane charge alone often does not suffice to effect complete removal of active catalyst constituents from the catalyst introduced into the upper part thereof. To supplement the charge functioning as the scrubbing agent, a portion of the butane stream is diverted from line 15 through line 46 and introduced into pentane charge line 1, leading to scrubber 5.

Though appreciable separation of catalyst from hydrocarbon is effected by stratification in separator 9, a certain amount of active catalyst components will generally be contained in the upper hydrocarbon layer. The upper hydrocarbon layer is passed from separator 9 through line 22 into a catalyst separating column 23. Within column 23 hydrocarbons comprising isopentane, pentane, butanes and HCl are separated as a vapor fraction from a liquid fraction comprising entrained catalyst. The liquid fraction is returned to reactor 8 through line 24. The vapor fraction is passed through line 25 containing cooler 26 into an accumulator 27. In passing through cooler 26 the stream is cooled to effect the condensation of pentanes.

Uncondensed material comprising hydrogen chloride, butanes and some inert gas formed in the system is continuously or intermittently withdrawn from accumulator 27 through line 28 and introduced into the lower part of an absorber 29. Within absorber 29 the vapors are contacted with a suitable scrubbing medium introduced into the upper part of absorber 29 by means of line 29a. HCl is absorbed by the scrubbing medium and overhead, comprising vapors and gas substantially free of any HCl, is passed through valved line 31 into line 32 to be recycled to line 16. To prevent building up of gas within the system, a valved line 47 is provided through which a part of the uncondensed material may be eliminated from the system.

Liquid comprising pentanes, some butanes and dissolved HCl is forced through line 35 into stripping column 33. Within column 33 a vapor fraction comprising HCl is separated from a liquid fraction comprising butanes and pentanes. The vapor fraction is passed from column 33 through lines 34 and 10 to line 6. Make-up HCl is introduced as required into line 10 by means of valved line 37. Liquid is taken from the lower part of column 33 and passed through valved line 38 into a fractionator 39. Within fractionator 39 butanes are separated from the pentanes. The butanes are passed through lines 40 and 32 to line 16. A liquid fraction comprising pentanes is removed from fractionator 39 and forced through line 42 into fractionator 43. Within fractionator 43 separation of a vapor fraction comprising isopentanes from a liquid fraction comprising unconverted normal pentane is effected. The vapor fraction is removed through line 41 as a final product. Normal pentane is recycled from column 43 through lines 45 and 46 to line 2.

A portion of the bottoms from stripping column 33 may be taken from line 38 and passed into the upper part of absorber 29 to serve as the absorbing medium for the HCl. The resulting rich absorbent is taken from the bottom of absorber 29 and passed through valved line 30 into line 35.

At times it may be desirable to partly or completely bypass scrubber 5. A valved line 49 passing directly from line 4 to line 6 is therefore provided.

Although the invention is applied with particular advantage to the treatment of hydrocarbons having from 5 to 10 carbon atoms to the molecule or fractions comprising them for the purpose of converting such hydrocarbons to isomers thereof of branched and more highly branched structure, the invention may be applied to the treatment, with the aid of fluid type isomerization catalysts, of hydrocarbon mixtures boiling within the motor fuel boiling range, such as straight-run gasoline, light naphthas, etc., for the purpose of increasing the over-all content of branched chain hydrocarbons in such mixtures and thereby increasing octane rating and general performance characteristics of these materials.

We claim as our invention:

1. In a process for converting normal pentane to isopentane wherein normal pentane is contacted in admixture with a hydrogen halide promoter at isomerizing conditions with an isomerization catalyst comprising aluminum chloride in a reaction zone, and effluence from the reaction zone is passed into a product separating zone, the combination of steps which comprise using as the isomerization catalyst a fluid melt consisting of molten antimony trichloride containing up to about 2% by weight of aluminum chloride, maintaining a ratio of fluid melt to hydrocarbons to be isomerized in the reaction zone in the range of from about 1:1 to about 1:5, separately withdrawing spent catalyst from the reaction zone substantially as rapidly as formed therein, passing a solvent comprising paraffinic hydrocarbons having four carbon atoms to the molecule through an aluminum chloride-containing vessel in the substantial absence of hydrogen halide promoter, thereby dissolving aluminum chloride in said solvent, passing solvent comprising dissolved aluminum chloride from said aluminum chloride-containing vessel to the reaction zone in controlled amount to introduce aluminum chloride into the reaction zone at a rate substantially equal to the rate at which aluminum chloride is removed therefrom in said spent catalyst, separating said solvent from reaction products and hydrogen halide in the product separating zone, and passing solvent free of any substantial amount of hydrogen halide from the product separating zone to said aluminum chloride-containing vessel.

2. In a process for isomerizing paraffin hydrocarbons having from five to ten carbon atoms to the molecule wherein said hydrocarbons are contacted in admixture with a hydrogen halide promoter with an isomerization catalyst comprising aluminum chloride in a reaction zone, and effluence from the reaction zone is passed into a product separating zone, the combination of steps which comprise using as the isomerization catalyst a fluid melt consisting of molten antimony trichloride containing up to about 2% by weight of aluminum chloride, maintaining a ratio of fluid melt to hydrocarbons to be isomerized in the reaction zone in the range of from about 1:1 to about 1:5, separately withdrawing spent catalyst from the reaction zone substantially as rapidly as formed therein, passing a solvent comprising paraffinic hydrocarbons having four carbon atoms to the molecule through an aluminum chloride-containing vessel in the substantial absence of hydrogen halide promoter, thereby dissolving aluminum chloride in said solvent, passing solvent comprising dissolved aluminum chloride from said aluminum chloride-containing vessel to the reaction zone in controlled amount to introduce aluminum chloride into the reaction zone at a rate substantially equal to the rate at which aluminum chloride is removed therefrom in said spent catalyst, separating said solvent from reaction products and hydrogen halide in the product separating zone, and passing solvent free of any substantial amount of hydrogen halide from the product separating zone to said aluminum chloride-containing vessel.

3. In a process for isomerizing paraffin hydrocarbons having from five to ten carbon atoms to the molecule wherein said hydrocarbons are contacted in admixture with a hydrogen halide promoter with an isomerization catalyst comprising aluminum halide in a reaction zone, and effluence from the reaction zone is passed into a product separating zone, the combination of steps which comprise using as the isomerization catalyst a fluid melt consisting of molten antimony halide containing up to about 2% by weight of aluminum halide, maintaining a ratio of fluid melt to hydrocarbons to be isomerized in the reaction zone in the range of from about 1:1 to about 1:5 separately withdrawing spent catalyst from the reaction zone substantially as rapidly as formed therein, passing a solvent comprising paraffinic hydrocarbons having four carbon atoms to the molecule through an aluminum halide-containing vessel in the substantial absence of hydrogen halide promoter, thereby dissolving aluminum halide in said solvent, passing solvent comprising dissolved aluminum halide from said aluminum halide-containing vessel to the reaction zone in controlled amount to introduce aluminum halide into the reaction zone at a rate substantially equal to the rate at which aluminum halide is removed therefrom in said spent catalyst, separating said solvent from reaction products and hydrogen halide in the product separating zone, and passing solvent free of any substantial amount of hydrogen halide from the product separating zone to said aluminum halide-containing vessel.

4. In a process for isomerizing paraffin hydrocarbons having from five to ten carbon atoms to the molecule wherein said hydrocarbons are contacted in admixture with a hydrogen halide promoter at isomerizing conditions with an isomerization catalyst comprising a metal halide of the Friedel-Crafts type in a reaction zone, and effluence from the reaction zone is passed into a product separating zone, the combination of steps which comprise using as the isomerization catalyst a fluid melt consisting of a dilute solution of a metal halide of the Friedel-Crafts type in a molten metal halide salt other than a metal halide of the Friedel-Crafts type, maintaining the ratio of fluid melt to hydrocarbons to be isomerized in the reaction zone in the range of from about 1:5 to about 3:1, separately withdrawing spent catalyst from the reaction zone substantially as fast as formed therein, passing a solvent comprising paraffinic hydrocarbons having four carbon atoms to the molecule through a supply-vessel containing a supply of said metal halide in the substantial absence of hydrogen halide promoter, thereby dissolving metal halide in said solvent, passing solvent comprising dissolved metal halide from said supply-vessel to the reaction zone in controlled amount to introduce metal halide into the reaction zone at a rate substantially equal to the rate at which metal halide is removed therefrom in said spent catalyst, separating said solvent from reaction products and hydrogen halide in the product separating zone, and passing solvent free of any substantial amount of hydrogen halide from the product separating zone to said supply-vessel.

5. In a process for isomerizing paraffin hydrocarbons having from five to ten carbon atoms to the molecule wherein said hydrocarbons are contacted in admixture with a hydrogen halide promoter at isomerizing conditions with an isomerization catalyst comprising a metal halide of the Friedel-Crafts type in a reaction zone, and effluence from the reaction zone is passed into a product separating zone, the combination of steps which comprise using as the isomerization catalyst a fluid melt consisting of a dilute solution of a metal halide of the Friedel-Crafts type in a molten halide of antimony, maintaining the ratio of fluid melt to hydrocarbons to be isomerized in the reaction zone in the range of from about 1:5 to about 3:1, separately withdrawing spent catalyst from the reaction zone substantially as fast as formed therein, passing a solvent for said metal halide comprising paraffinic hydrocarbons having four carbon atoms to the molecule through a supply-vessel containing a supply of said metal halide in the substantial absence of hydrogen halide promoter, thereby dissolving metal halide in said solvent, passing solvent comprising dissolved metal halide from said supply-vessel to the reaction zone in controlled amount to introduce metal halide into the reaction zone at a rate substantially equal to the rate at which metal halide is removed therefrom in said spent catalyst, separating said solvent from reaction products and hydrogen halide in the product separating zone, and passing solvent free of any substantial amount of hydrogen halide from the product separating zone to said supply-vessel.

6. In a process for isomerizing paraffin hydrocarbons having from five to ten carbon atoms to the molecule wherein said hydrocarbons are contacted in admixture with a hydrogen halide promoter with an isomerization catalyst comprising aluminum chloride in a reaction zone, and effluence from the reaction zone is passed into a product separating zone, the combination of steps which comprise using as the isomerization catalyst a fluid melt consisting of molten antimony trichloride containing up to about 2% by weight of aluminum chloride, maintaining a ratio of fluid melt to hydrocarbons to be isomerized in the reaction zone in the range of from about 1:1 to about 1:5, separately withdrawing spent catalyst from the reaction zone substantially as rapidly as formed therein, passing a solvent comprising paraffinic hydrocarbons having four carbon atoms to the molecule through an aluminum chloride-containing vessel in the substantial absence of hydrogen halide promoter, thereby dissolving aluminum chloride in said solvent, maintaining a substantially constant flow of said solvent through the aluminum chloride-containing vessel, passing solvent comprising dissolved aluminum chloride from said aluminum chloride-containing vessel to the reaction zone, controlling the concentration of the aluminum chloride in the solvent passed from the aluminum chloride-containing vessel to the reaction zone by controlling the temperature of said solvent entering the aluminum chloride containing vessel to result in the introduction of the aluminum chloride into the reaction zone at a rate substantially equal to the rate at which aluminum chloride is removed from the reaction zone in the spent catalyst, separating said solvent from reaction products and hydrogen halide in the product separating zone, and passing solvent free of any substantial amount of hydrogen halide from the product separating zone to said aluminum chloride-containing vessel.

7. In a process for isomerizing paraffin hydrocarbons having from five to ten carbon atoms to the molecule wherein said hydrocarbons are contacted in admixture with a hydrogen halide promoter with an isomerization catalyst comprising aluminum halide in a reaction zone, and effluence from the reaction zone is passed into a product separating zone, the combination of steps which comprise using as the isomerization catalyst a fluid melt consisting of molten antimony halide containing up to about 2% by weight of aluminum halide, maintaining a ratio of fluid melt to hydrocarbons to be isomerized in the reaction zone in the range of from about 1:1 to about 1:5 separately withdrawing spent catalyst from the reaction zone substantially as rapidly as formed therein, passing a solvent comprising paraffinic hydrocarbons having four carbon atoms to the molecule through an aluminum halide-containing vessel in the substantial absence of hydrogen halide promoter, thereby dissolving aluminum halide in said solvent, maintaining a substantially constant flow of said solvent through the aluminum halide-containing vessel, passing solvent comprising dissolved aluminum halide from said aluminum halide-containing vessel to the reaction zone, controlling the concentration of the aluminum halide in the solvent passed from the aluminum halide-containing vessel to the reaction zone by controlling the temperature of said solvent entering the aluminum halide containing vessel to result in the introduction of the aluminum halide into the reaction zone at a rate substantially equal to the rate at which aluminum halide is removed from the reaction zone in the spent catalyst, separating said solvent from reaction products and hydrogen halide in the product separating zone, and passing solvent free of any substantial amount of hydrogen halide from the product separating zone to said aluminum halide-containing vessel.

8. In a process for isomerizing paraffin hydrocarbons having from five to ten carbon atoms to the molecule wherein said hydrocarbons are contacted in admixture with a hydrogen halide promoter with an isomerization catalyst comprising a metal halide of the Friedel-Crafts type in a reaction zone, and effluence from the reaction zone is passed into a product separating zone, the combination of steps which comprise using as the isomerization catalyst a fluid melt consisting of a dilute solution of a metal halide of the Friedel-Crafts type in a molten metal halide salt other than a metal halide of the Friedel-Crafts type, maintaining the ratio of fluid melt to hydrocarbons to be isomerized in the reaction zone in the range of from about 1:5 to about 3:1, separately withdrawing spent catalyst from the reaction zone substantially as rapidly as formed therein, passing a solvent comprising paraffinic hydrocarbons having four carbon atoms to the molecule through a supply-vessel containing a supply of said metal halide in the substantial absence of any hydrogen halide promoter, thereby dissolving metal halide in said solvent, maintaining a substantially constant flow of said solvent through said supply-vessel, passing solvent comprising dissolved metal halide from said supply-vessel to the reaction zone, controlling the concentration of said metal halide in the solvent passed from the supply-vessel to the reaction zone by controlling the temperature of said solvent entering the supply-vessel to result in the introduction of metal halide into the reaction zone at a rate substantially equal to the rate at which metal halide is removed from the reaction zone in the spent catalyst, separating said solvent from the reaction products and hydrogen halide in the product separating zone, and passing solvent free of any substantial amount of hydrogen halide from the product separating zone to said supply-vessel.

9. In a process for isomerizing paraffin hydrocarbons having from five to ten carbon atoms to the molecule wherein said hydrocarbons are contacted in admixture with a hydrogen halide promoter with an isomerization catalyst comprising a metal halide of the Friedel-Crafts type in a reaction zone, and effluence from the reaction zone is passed into a product separating zone, the combination of steps which comprise using as the isomerization catalyst a fluid melt consisting of a dilute solution of a metal halide of the Friedel-Crafts type in a molten halide of antimony, maintaining the ratio of fluid melt to hydrocarbons to be isomerized in the reaction zone in the range of from about 1:5 to about 3:1, separately withdrawing spent catalyst from the reaction zone substantially as rapidly as formed therein, passing a solvent for said metal halide comprising paraffinic hydrocarbons having four carbon atoms to the molecule through a supply-vessel containing a supply of said metal halide in the substantial absence of any hydrogen halide promoter, thereby dissolving metal halide in said solvent, maintaining a substantially constant flow of said solvent through said supply-vessel, passing solvent comprising dissolved metal halide from said supply-vessel to the reaction zone, controlling the concentration of said metal halide in the solvent passed from the supply-vessel to the reaction zone by controlling the temperature of said solvent entering the supply-vessel to result in the introduction of metal halide into the reaction zone at a rate substantially equal to the rate at which metal halide is removed from the reaction zone in the spent catalyst, separating said solvent from the reaction products and hydrogen halide in the product separating zone, and passing solvent free of any substantial amount of hydrogen halide from the product separating zone to said supply-vessel.

WILLIAM E. ROSS.
GEORGE J. CARLSON.